April 17, 1934.  J. T. McMILLAN  1,955,009
PAN FILLING APPARATUS
Filed Jan. 27, 1933
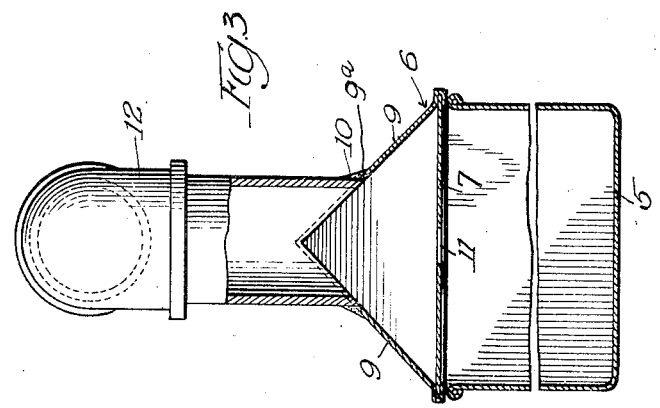
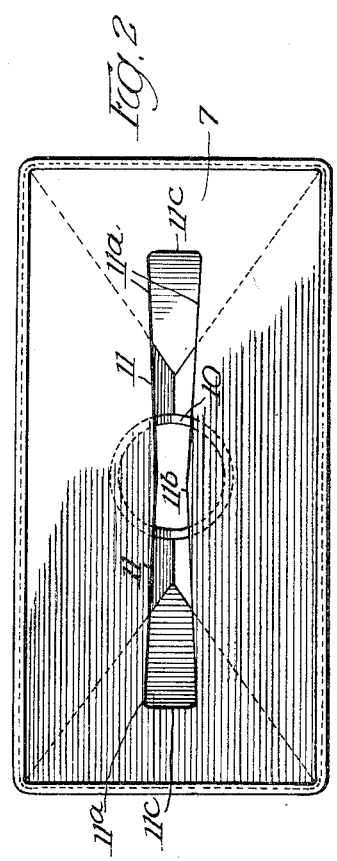
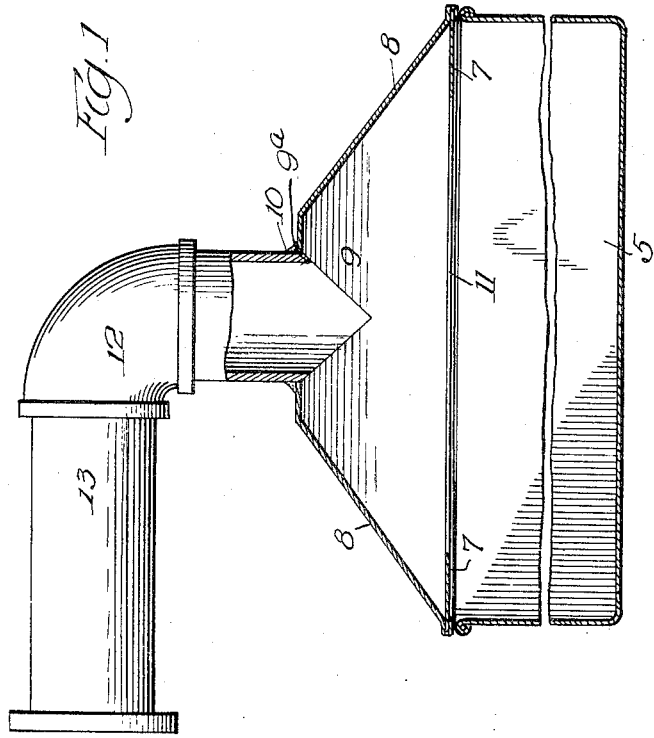
Inventor:
James Thompson McMillan
By Fred Gerlach
his Atty.

Patented Apr. 17, 1934

1,955,009

UNITED STATES PATENT OFFICE 1,955,009

PAN FILLING APPARATUS

James Thompson McMillan, St. Paul, Minn., assignor to Packers Equipment Development Company, Chicago, Ill., a corporation of Illinois Application January 27, 1933, Serial No. 653,883

1 Claim. (Cl. 226—93)

The invention relates to devices for filling baking pans with material, such as a mixture containing ground meat for producing meat loaf, and the primary object of the invention is to provide a device which is so constructed that in use thereof, it operates to deliver the material into the pans in such a manner that it has the same consistency or density throughout the entire mass, and thus insures an even baking or roasting of the product.

Another object of the invention is to provide a pan filling device which is generally of new and improved construction and may be manufactured at a low and reasonable cost.

Other objects of the invention and the various advantages and characteristics of the present pan filling device will be apparent from a consideration of the following detailed description.

The invention consists in the novel features which are hereinafter set forth and are more particularly defined by the claim hereafter.

In the drawing which accompanies and forms a part of this description or specification and which like numerals of reference denote corresponding parts throughout the several views.

Figure 1 is a vertical section of a filling device embodying the invention;

Figure 2 is an inverted plan; and

Figure 3 is a transverse section.

The invention is exemplified in a device for filling a baking pan 5 with material, such as a mixture containing ground meat for producing meat loaf. This device comprises a hollow discharge-head 6 which is formed of sheet metal and has a coupling-pipe 10 soldered or otherwise secured to the top portion thereof. The meat or mixture of material is forced under pressure into the head 6 through a pipe-section 13 which is connected to coupling-pipe 10 by an elbow 12.

The head comprises a flat bottom 7 which is adapted to be held over and to rest on the baking pan 5. The margin of the bottom 7 is adapted to engage the rim of the pan so the head will cover the open top of the pan as shown in Figure 1. The pipe-section 13 is connected to a tank containing the material, by a flexible pipe (not shown) so the head can be moved into filling-position over the pan. The bottom 7 is rectangular in shape in order to conform to the pan, which is elongated in one direction to form a loaf of meat which can be cut into slices of convenient size for consumption. The head extends over the entire pan during the filling operation. It is pyramidal or flared outwardly and downwardly from the coupling-pipe 10 to the bottom 7, so that material from the inlet pipe can flow or spread over substantially the entire area of the bottom 7. The head comprises inclined side-walls 9 and inclined end-walls 8. The side-walls 9 are united at the top portion of the head and have an inlet opening $9^a$ cut therein. The lower end of the coupling-pipe 10 is cut away so as to straddle the V-shaped top portion of the head and is welded or otherwise secured to the side-walls 9 in registry with the inlet opening $9^a$.

A desideratum in a filling pan for baking meat products is evenly to distribute the material throughout the depth and area of the pan, and to deposit it so it will be of uniform consistency or density throughout, because unevenly packed material will not be uniformly baked or roasted.

In view of this fact, the bottom 7 is provided with a discharge opening 11 which is elongated longitudinally of the pan and is proportionally narrow transversely of the pan. The sides of the slot are shaped so the central portion $11^b$ of the slot which is directly below the inlet opening is constricted or narrower in width than the end portions $11^a$ of the slot, and so the slot has gradually increased width from its center to its ends. The ends $11^c$ of the slot are straight as shown in Figure 2 of the drawing. The shape of the slot somewhat limits the discharge at the center of the slot of the direct stream of material from the inlet opening and distributes it longitudinally toward the ends of the head, and permits graduated freer discharge between the center and the ends of the head. This causes the distribution of the material in the head over the entire length of the slot and the discharge of the material in uniform volume of even density throughout the length of the pan to build up an even column of material in the pan and to fill all portions of the pan with material of the same density or consistency. When the pan is filled in this manner, the baked or roasted product will be evenly cooked, because the material has been filled with material of even density.

The invention is not to be understood as restricted to the details set forth, since these may be modified within the scope of the appended claim, without departing from the spirit and scope of the invention.

Having thus described the invention, what I claim as new and desire to secure by Letters Patent, is:

A device designed to fill a rectangular baking pan with material to be baked and comprising an elongated head shaped to fit over and completely cover the pan and consisting of opposed side and end walls and a flat, rectangular bottom, the side walls being inclined downwardly and outwardly and joined together at the upper edges thereof so that in cross section the head is in the form of an inverted V, the end walls being inclined downwardly and outwardly and joined to the end edges of the side walls and the bottom being joined at the edges thereof to the bottom edges of the side and end walls and having formed therein a slot extending longitudinally, and substantially to the ends, thereof, and having a restricted central portion and end portions that increase progressively in width outwardly from the central portion, and a vertically extending pipe adapted to receive the material under pressure and connected to the central portion of the top of the head so that it overlies the restricted portion of the slot in the bottom and operates upon flow of the material therethrough to discharge the material downwardly into the head for discharge via the slot into the pan.

JAMES THOMPSON McMILLAN.